(12) United States Patent
Mor

(10) Patent No.: US 10,539,332 B1
(45) Date of Patent: Jan. 21, 2020

(54) MOUNTABLE HEAT SHIELD

(71) Applicant: Edward Mor, West Linn, OR (US)

(72) Inventor: Edward Mor, West Linn, OR (US)

(*) Notice: Subject to any disclaimer, the term of this patent is extended or adjusted under 35 U.S.C. 154(b) by 0 days.

(21) Appl. No.: 16/547,469

(22) Filed: Aug. 21, 2019

Related U.S. Application Data

(60) Provisional application No. 62/720,357, filed on Aug. 21, 2018.

(51) Int. Cl.
| | |
|---|---|
| *F24C 15/36* | (2006.01) |
| *B32B 13/06* | (2006.01) |
| *B32B 15/20* | (2006.01) |
| *B32B 15/18* | (2006.01) |
| *B32B 33/00* | (2006.01) |
| *A47J 37/07* | (2006.01) |

(52) U.S. Cl.
CPC .......... *F24C 15/36* (2013.01); *A47J 37/0786* (2013.01); *B32B 13/06* (2013.01); *B32B 15/18* (2013.01); *B32B 15/20* (2013.01); *B32B 33/00* (2013.01); *B32B 2307/304* (2013.01); *B32B 2307/306* (2013.01); *B32B 2571/00* (2013.01)

(58) Field of Classification Search
CPC .......... A47J 37/0786; B32B 2307/304; B32B 2307/306; B32B 2307/31; B32B 2307/3065; B32B 2307/308
See application file for complete search history.

(56) References Cited

U.S. PATENT DOCUMENTS

| | | | |
|---|---|---|---|
| 2,025,898 A | 12/1935 | Rhodes | |
| 2,920,243 A | 1/1960 | Taren | |
| 3,182,585 A | 5/1965 | Rensch | |
| 3,538,905 A * | 11/1970 | Reichenbach | ...... A47J 37/0786 126/25 B |
| 3,601,036 A | 8/1971 | Kohorn | |
| 3,646,928 A | 3/1972 | Grafton | |
| 3,688,757 A | 9/1972 | Dusek | |
| 3,692,013 A | 9/1972 | Grafton | |
| 3,789,822 A | 2/1974 | Schantz | |
| 4,119,081 A | 10/1978 | Edwards | |
| 4,405,008 A | 11/1983 | Hazlett | |
| 4,462,306 A | 7/1984 | Eisendrath | |
| D303,909 S * | 10/1989 | Stankus | ........................ D7/406 |
| 5,000,085 A | 3/1991 | Archer | |
| 5,086,753 A | 2/1992 | Berger | |
| 5,163,358 A | 11/1992 | Hanagan | |
| 5,351,673 A * | 10/1994 | Somerton | ............... F24C 15/12 126/214 D |
| 5,785,046 A | 7/1998 | Colla | |
| 5,842,465 A | 12/1998 | Cassidy | |
| 5,981,914 A | 11/1999 | Schultheis | |
| 6,038,965 A | 3/2000 | Thorndyke | |
| 6,557,546 B1 | 5/2003 | Gibbons | |
| 6,644,298 B2 | 11/2003 | Hermansen | |
| 6,755,187 B2 | 6/2004 | Harrod | |

(Continued)

*Primary Examiner* — David J Laux
(74) *Attorney, Agent, or Firm* — The Law Offices of Eric W. Peterson

(57) ABSTRACT

A heat shield having a shield member having a deflection layer, an absorption layer, a protection layer, and a protective boarder, and an attachment mechanism configured to mount the shield member to a heat source, where the attachment mechanism has at least one hook bracket and at least one stabilizing bracket.

20 Claims, 9 Drawing Sheets

(56) References Cited

U.S. PATENT DOCUMENTS

| | | | |
|---|---|---|---|
| 6,973,927 B1 * | 12/2005 | Stewart | A47J 37/0786 |
| | | | 126/201 |
| 6,981,536 B2 | 1/2006 | Lien | |
| 7,219,663 B2 | 5/2007 | Cuomo | |
| 7,997,188 B2 | 8/2011 | Umali | |
| 8,316,836 B2 | 11/2012 | Grasso | |
| 8,720,593 B1 | 5/2014 | Root | |
| 8,752,539 B2 | 7/2014 | Paap | |
| 8,851,060 B2 | 10/2014 | Johnson | |
| 9,038,620 B2 | 5/2015 | Brown | |
| 9,844,300 B2 | 12/2017 | Cedar | |
| 2003/0230298 A1 * | 12/2003 | Klarich | F24C 15/36 |
| | | | 126/9 R |
| 2004/0144059 A1 * | 7/2004 | Keshmiri | B28B 1/50 |
| | | | 52/741.1 |
| 2006/0196492 A1 | 9/2006 | Whitmer | |
| 2013/0112088 A1 | 5/2013 | May | |
| 2017/0336076 A1 | 11/2017 | Walters | |

\* cited by examiner

MOUNTABLE HEAT SHIELD

CROSS-REFERENCE TO RELATED APPLICATION

This application claims the benefit of U.S. Provisional Application No. 62/720,357 filed on Aug. 21, 2018, which is incorporated herein by reference in its entirety.

BACKGROUND

Many people purchase barbecues for their home or apartment to use. Sometimes people desire to place the barbecue in close proximity to a fence, wall or even window. However, in close proximity damage to property or personal safety can result due to the heat expelled from the barbecue. One option is to place the barbecue away from a structure, but this can require unavailable space when desiring to place the barbecue in a small area such as a patio, small yard, or porch.

SUMMARY OF THE INVENTION

The present disclosure pertains to a heat shield having a shield member having a deflection layer and an absorption layer, and an attachment mechanism configured to mount the shield member to a heat source. Another aspect of the disclosure is a heat shield wherein the absorption layer is made of a cement backerboard material. Another aspect of the disclosure is a heat shield wherein the shield member further has a protection layer. Another aspect of the disclosure is a heat shield wherein the absorption layer is positioned between the deflection layer and the protection layer. Another aspect of the disclosure is a heat shield wherein a thickness of the protection layer is greater than the thickness of the deflection layer. Another aspect of the disclosure is a heat shield wherein the shield member has an air gap layer positioned between the absorption layer and the protection layer. Another aspect of the disclosure is a heat shield wherein the shield member has a protective boarder extending at least a portion of the periphery of the shield member. Another aspect of the disclosure is a heat shield wherein the shield member has a vertical portion and an angled portion, wherein the angled portion engages the vertical portion at an angle less than 180 degrees.

Another aspect of the disclosure is a heat shield wherein the attachment mechanism has at least one hook bracket. Another aspect of the disclosure is a heat shield wherein the hook bracket has a hook securing portion, a hook extension portion, and a hook portion configures to engage a portion of the heat source, wherein the hook portion engages the hook extension portion. Another aspect of the disclosure is a heat shield wherein the hook bracket further has a hook adjustment mechanism configured to allow for the length of the hook extension portion to increase or decrease. Another aspect of the disclosure is a heat shield wherein the attachment mechanism has at least one stabilizing bracket. Another aspect of the disclosure is a heat shield wherein the stabilizer bracket has a stabilizer securing portion and a stabilizer extension portion, wherein the stabilizer extension portion is configured to engage the heat source. Another aspect of the disclosure is a heat shield wherein the stabilizer bracket has a cover positioned on the end of the stabilizer extension portion configured to reduce the end of the stabilizer extension portion from scratching the heat source. Another aspect of the disclosure is a heat shield wherein the stabilizer bracket further has a stabilizer adjustment mechanism configured to allow for the length of the stabilizer extension portion to increase or decrease.

Another aspect of the disclosure is a heat shield wherein the attachment mechanism has at least one vertical rail configured to slideably engage a hook bracket or a stabilizer bracket. Another aspect of the disclosure is a heat shield wherein the vertical rail has a vertical channel and the hook bracket has a bracket protrusion extending from the back of the hook bracket, wherein the cross sectional shape of the bracket protrusion is substantially similar to the cross section shape of the vertical channel, and wherein the vertical channel is configured to receive the bracket protrusion. Another aspect of the disclosure is a heat shield wherein the attachment mechanism further has at least one horizontal rail configured to slideably engage the vertical rail. Another aspect of the disclosure is a heat shield wherein the horizontal rail has a horizontal protrusion and the vertical rail has a horizontal channel formed into the back of the vertical rail, wherein the cross-sectional shape of the horizontal channel is substantially similar to the cross sectional shape of the horizontal protrusion, and wherein the horizontal channel is configured to receive the horizontal protrusion.

BRIEF DESCRIPTION OF THE DRAWINGS

The accompanying drawings, which are incorporated herein and form part of the specification, illustrate various embodiments of the present invention and together with the description, further serve to explain the principles of the invention and to enable a person skilled in the pertinent art to make and use the invention. In the drawings, like reference numbers indicate identical or functionally similar elements. A more complete appreciation of the invention and many of the attendant advantages thereof will be readily obtained as the same becomes better understood by reference to the following detailed description when considered in connection with the accompanying drawings, wherein.

DETAILED DESCRIPTION

In the following detailed description, reference is made to the accompanying drawings which form a part hereof and in which is shown by way of illustration specific embodiments in which the invention may be practiced. These embodiments are described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

The present disclosure pertains to heat shield 10 for deflecting and absorbing thermal energy expelled by a heat source 20, thereby reducing the amount of thermal energy transferred to a protected area 12. The heat shield 10 serves as a barrier by absorbing heat and deflecting heat upwards and away from a wall, window, window frame, fence, vegetation, glass door, glass door frame, or the like, i.e. a protected area 12, thereby protecting the protected area 12 and structures therein from damage by the heat. The heat shield 10 can attach to the heat source 20 thereby allowing the heat shield to be moved with the heat source 20.

Figure 1:
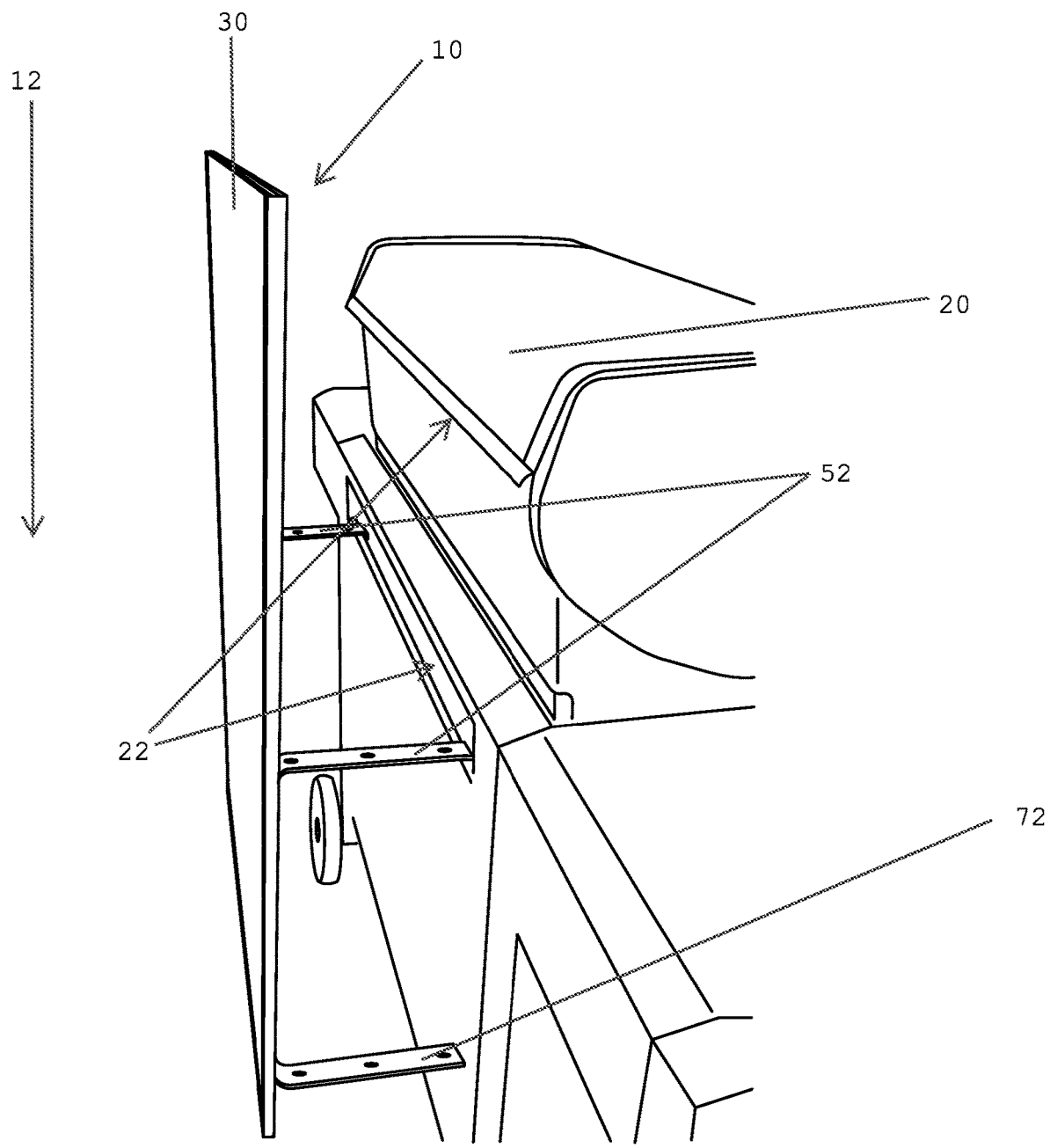
FIG. 1 is a perspective view of a heat shield according to an exemplary embodiment.
Figure 2:
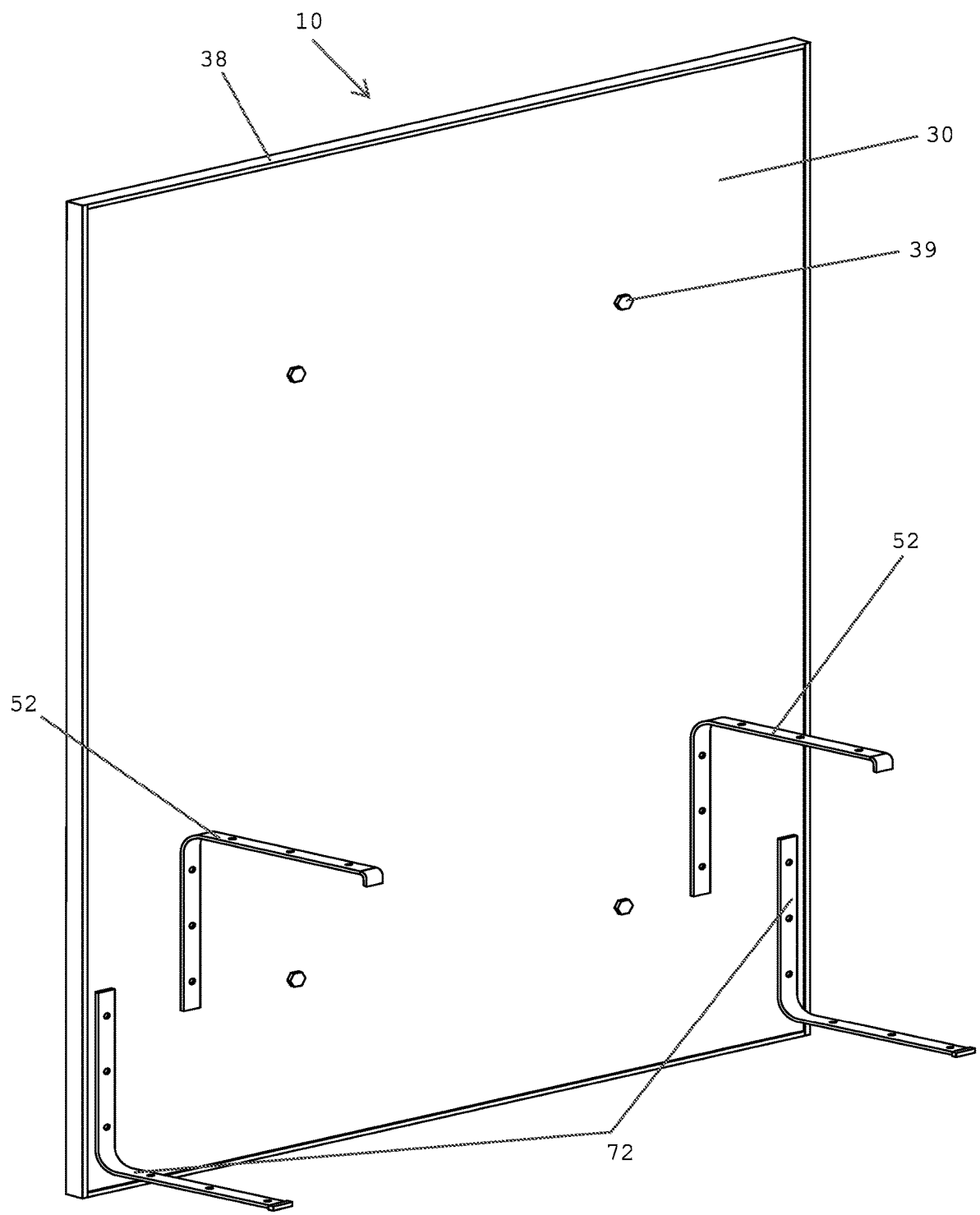
FIG. 2 is a perspective view of a heat shield according to an exemplary embodiment.
Figure 3:
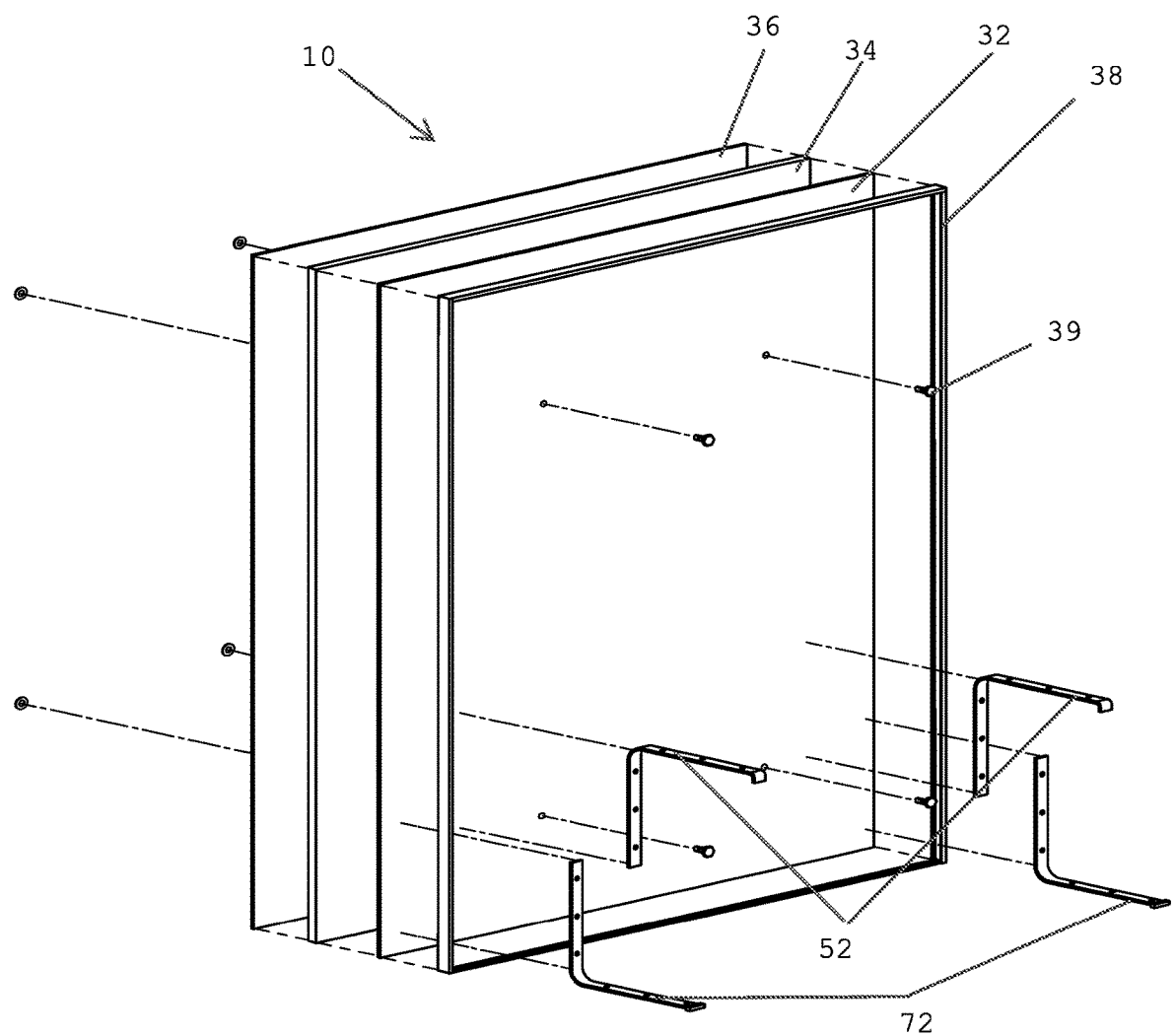
FIG. 3 is an exploded view of a heat shield according to an exemplary embodiment.

In one embodiment, as shown in FIGS. 1 & 2, the heat shield 10 can have a shield member 30 configured to protect against the transfer of thermal energy from the heat source 20 to a protected area 12. The heat source 20 can be a grill, barbecue, fireplace, fire pit, patio heater, or the like. In one embodiment, the heat source 20 has at least one vent 22 for allowing heat to escape from the grill. In one embodiment, the vent 22 is located in the back of the heat source 20. The shield member 30 can have a length that is substantially similar or greater than the length of the vent 22. As shown in FIG. 3, the shield member 30 can have a deflection layer 32, absorption layer 34, protection layer 36, or any combination thereof, in a vertical relationship. The layers of the shield member 30 can be secured together with layered securing means 39, for example, without limitation, any conventional attachment means, such as fasteners, such as bolts and nuts, and screws, adhesive, or the like.

The deflection layer 32 can be configured to deflect heat that is expelled from the heat source 20. The heat is deflected away from the protected area 12 causing it to travel up and over the heat source 20. In one embodiment, the deflection layer 32 can have an external surface 33 that is smooth. The deflection layer 32 can be made of aluminum, zinc, stainless steel, or the like. The deflection layer 32 can be the layer of the shield member 30 positioned closest to the heat source 20. The deflection layer 32 can have a thickness of at least 0.019 inches or greater.

In one embodiment, the shield member 30 can have an absorption layer 34 configured to absorb and retain heat expelled from the heat source 20. In one embodiment, the absorption layer 34 is a heatsink configured to receive transferred thermal energy. While the absorption layer 34 is preferably made of cement, the absorption layer 34 can be made of any material capable of absorbing heat, for example, without limitation, cement backerboard. The absorption layer 34 can have a thickness of 0.25", 0.3", 0.35" 0.4", 0.45", 0.5", 1.0", or any range of thickness between any two thicknesses thereof. The thickness of the absorption layer 34 can depend on the heat absorption requirements.

In one embodiment, the shield member 30 can have a protection layer 36 configured to hinder heat transfer from the absorption layer 34 to the protected area 12. In one embodiment, the protection layer 36 has a thickness of 0.025", 0.05", 0.1", or any range of thickness between any two thicknesses thereof. The protection layer 36 can be the layer of the shield member 30 positioned closest to the protected area 12.

In one embodiment, the shield member 30 can have a deflection layer 32 and absorption layer 34. Here the deflection layer 32 can be positioned closest to the heat source 20 and the absorption layer 34 is positioned closest to the protected area 12.

In one embodiment, the shield member 30 can have a deflection layer 32, absorption layer 34, and protection layer 36. Here, the deflection layer 32 can be positioned closest to the heat source 20, the protection layer 36 can be positioned closest to the protected area 12, and the absorption layer 34 can be positioned between the deflection layer 32 and the protection layer 36. The protection layer 36 can have a thickness that is greater than the thickness of the deflection layer 32. The thicker protection layer 36 conducts thermal energy more slowly than the deflection layer 32 thereby encouraging the transfer of thermal energy from the absorption layer 34 through the deflection layer 32 and thereby reducing the transfer of thermal energy to the protected area 12.

In one embodiment, the shield member 30 can have an air gap layer. In one embodiment, the air gap layer is positioned between the absorption layer 34 and the protection layer 36. The air gap layer can further encourage the transfer of thermal energy from the absorption layer 34 to the deflection layer 32 thereby further reducing the transfer of thermal energy to the protected area 12.

In one embodiment, the shield member 30 can have a protective boarder 38 for preventing the absorption layer 34 from coming in contact with rain, snow, sun, or the like. The protective boarder 38 can extend at least a portion of the periphery of the shield member 30 or around the entire periphery of the shield member 30. The protective boarder 38 can be a C-channel having a width that is substantially similar to the thickness of the combined layers of the shield member 30. This allows for the channel in the protective boarder 38 to receive the combined layers.

Figure 4:
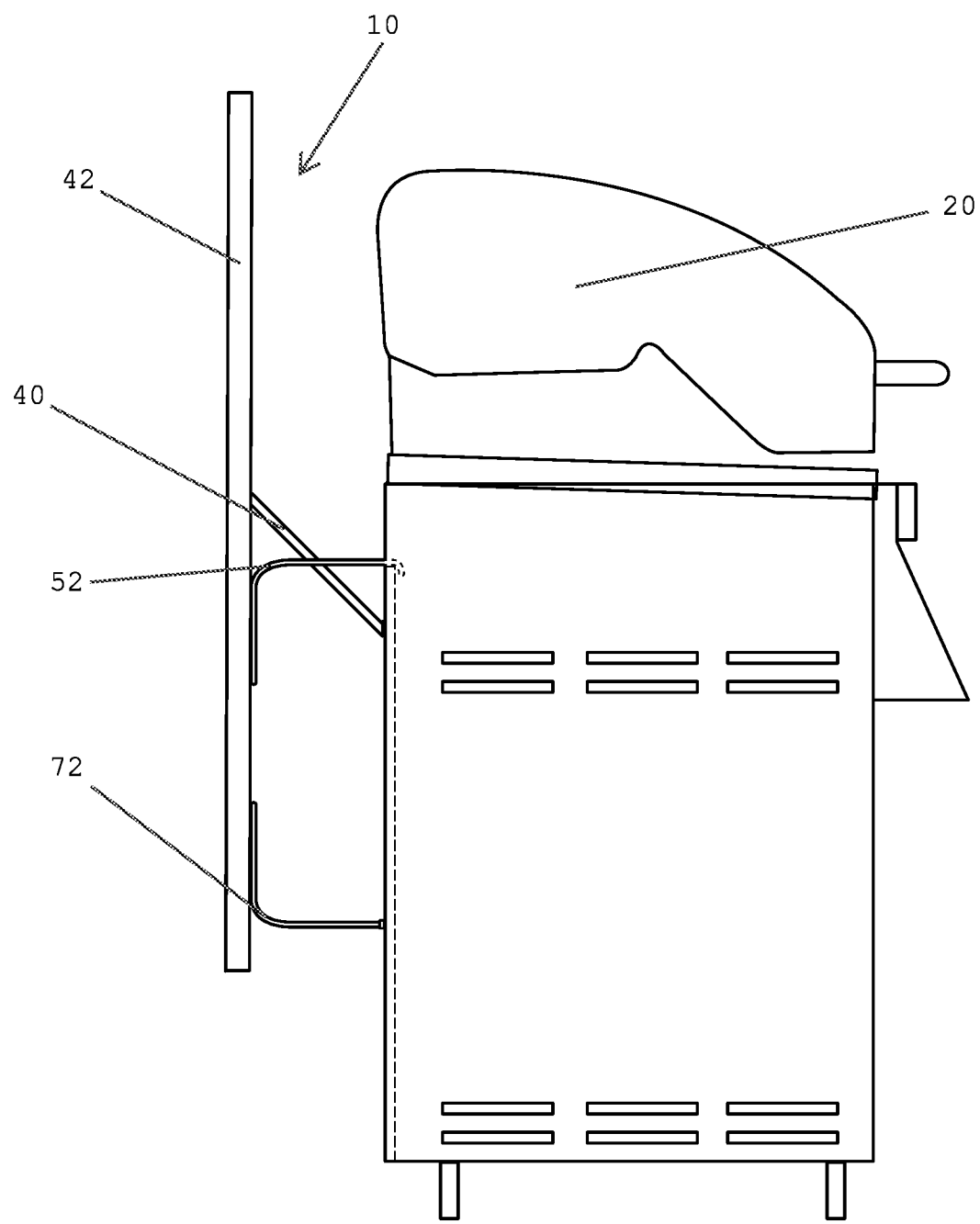
FIG. 4 is a side view of a heat shield according to an exemplary embodiment.

In one embodiment, as shown in FIG. 4, the shield member 30 can have an angled portion 40 for deflecting heat upward. The angled portion 40 can have a deflection layer 32, absorption layer 34, and protection layer 36, as described herein. The angled portion 40 can extend from the vertical portion 42 of the shield member 30 towards the heat source 20 at any desired angle less than 180°, for example, without limitation, a 45° angle, or the like. In one embodiment, the angled portion 40 rests against a portion of the heat source 20, for example, without limitation, a frame member, support member, panel member, leg, or the like. The angled portion 40 can engage or rest against a portion of the heat source 20 below the vent 22 in the heat source 20.

Figure 5:
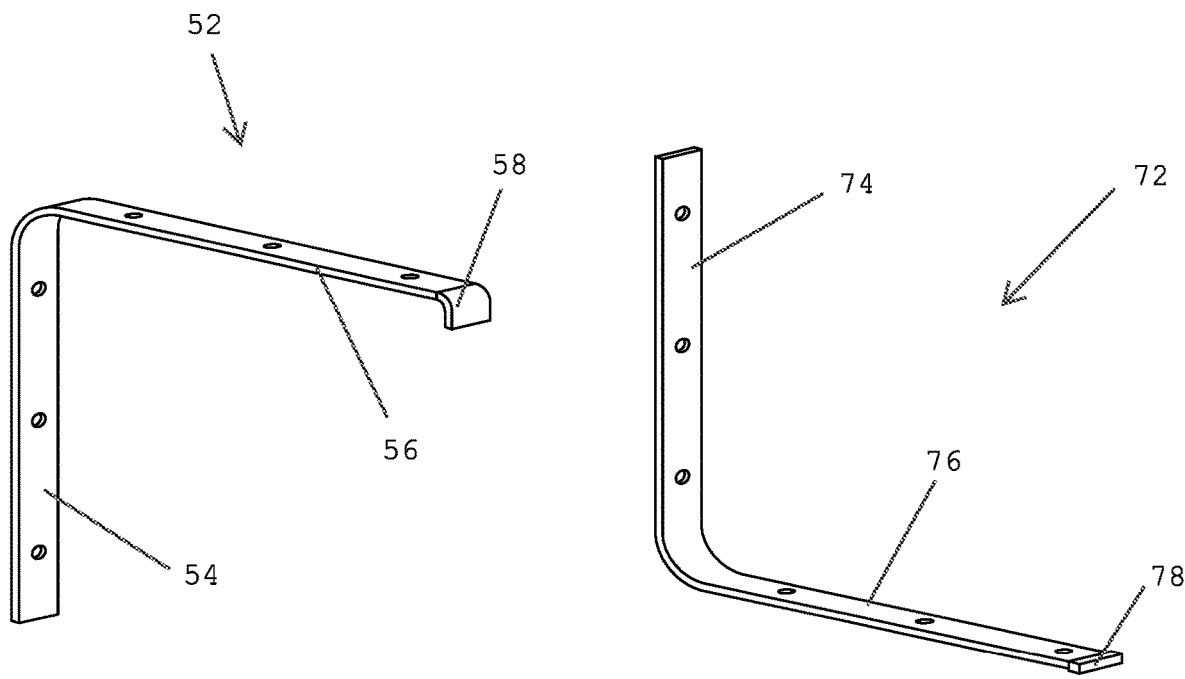
FIG. 5 is a perspective view of a hook bracket and stabilizer bracket according to an exemplary embodiment.

In one embodiment, the heat shield 10 can have an attachment mechanism for mounting the shield member 30 to the heat source 20. The attachment mechanism can be configured to allow for the shield member 30 to attach to any component of the heat source 20, for example, without limitation, where the heat source 20 is a grill, the attachment mechanism can attach to a frame member, support member, panel member, leg, or the like. The attachment mechanism can have at least one hook bracket 52. The hook bracket 52 can have a rigid 1-shaped bracket having a hook securing portion 54 configured to attach the hook bracket 52 to the heat shield 10 by way of, for example, without limitation, fasteners, such as bolts and nuts, and screws, adhesive, or the like, a hook extension portion 56 and a hook portion 58 engaged to the end of the hook extension portion 56. The hook portion 58 is configured to engage or hook onto a portion of the heat source 20, for example, without limitation, a frame member, support member, panel member, leg, or the like. In one embodiment, as shown in FIG. 5, the hook portion 58 and/or the hook extension portion 56 can have an adjustment mechanism 59 that allows for the length of the hook portion 58 or the hook extension portion 56 to increase or decrease depending on the desired distance between the heat source 20 and the shield member 30. The adjustment mechanism 59 allows for the lid of the heat source 20 to rotate back to the resting position without the shield member 30 interfering with the rotation of the lid. The hook length adjustment mechanism 59 can be any means for extending and locking in the length of a rod, support, leg, or the like, for example, without limitation, a button spring mechanism, pin with retaining clamp, bolt with locking nut, or the like.

In one embodiment, the heat shield 10 can have at least one stabilizer bracket 72 for providing support to the position of the shield member 30. The stabilizer bracket 72 can be a rigid 1-shaped bracket having a stabilizer securing portion 74 configured to attach the stabilizer bracket 72 to the heat shield 10 by way of, for example, without limitation, fasteners, such as bolts and nuts, and screws, adhesive, or the like, and a stabilizer extension portion 76. The stabilizer bracket 72 is configured to allow for the end of the stabilizer extension portion 76 to engage with, by way of fasteners, magnets or the like, or rest against a portion of the heat source 20, for example, without limitation, a frame member, support member, panel member, leg, or the like. In one embodiment, as shown in FIG. 5, the stabilizer extension portion 76 can have an adjustment mechanism 79 that allows for the length of the stabilizer extension portion 76 to increase or decrease depending on the desired distance between the heat source 20 and the shield member 30. The stabilizer length adjustment mechanism 79 can be any means for extending and locking in the length of a rod, support, leg, or the like, for example, without limitation, a button spring mechanism, pin with retaining clamp, bolt with locking nut, or the like.

Figure 6:
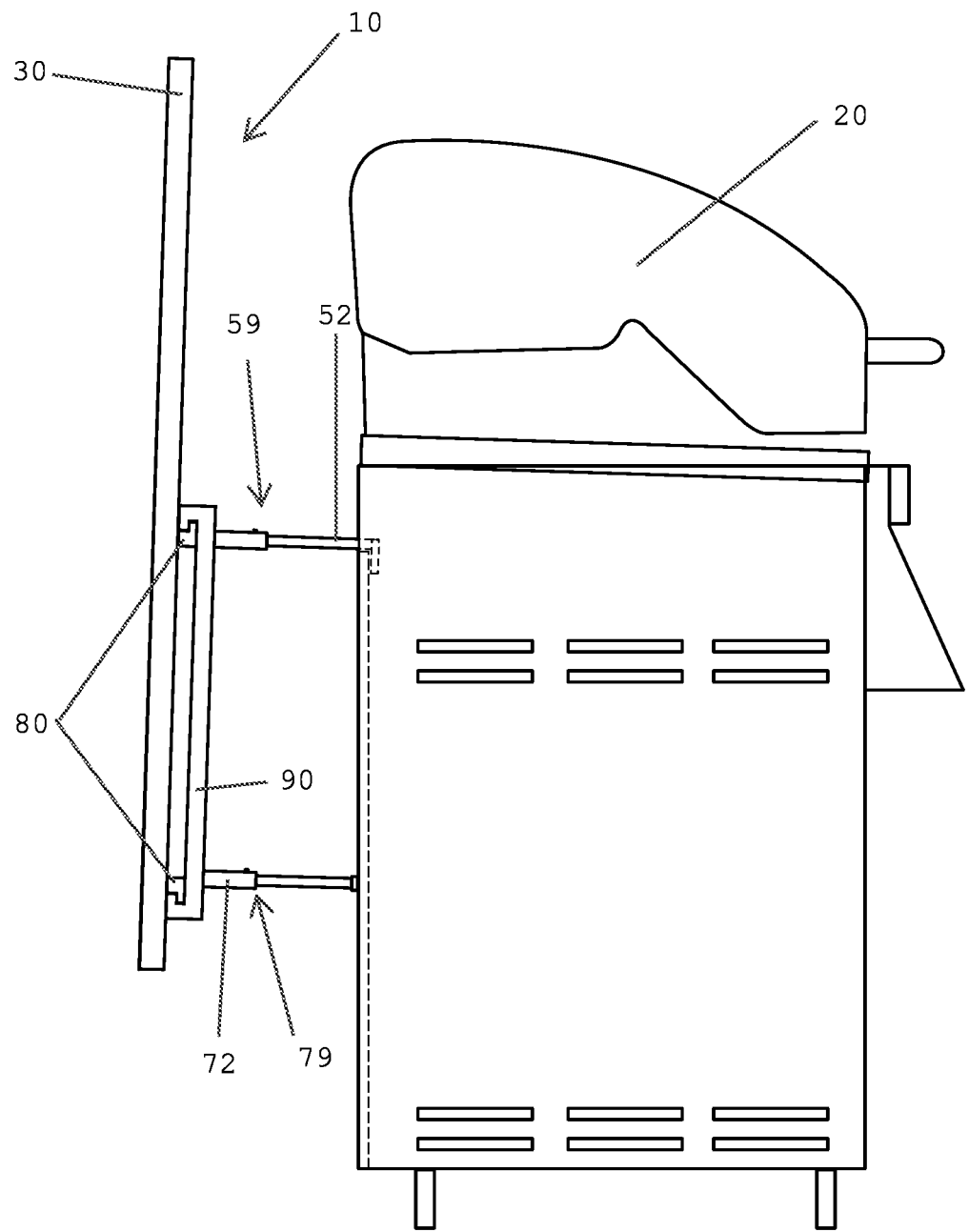
FIG. 6 is a side view of a heat shield according to an exemplary embodiment.
Figure 7:
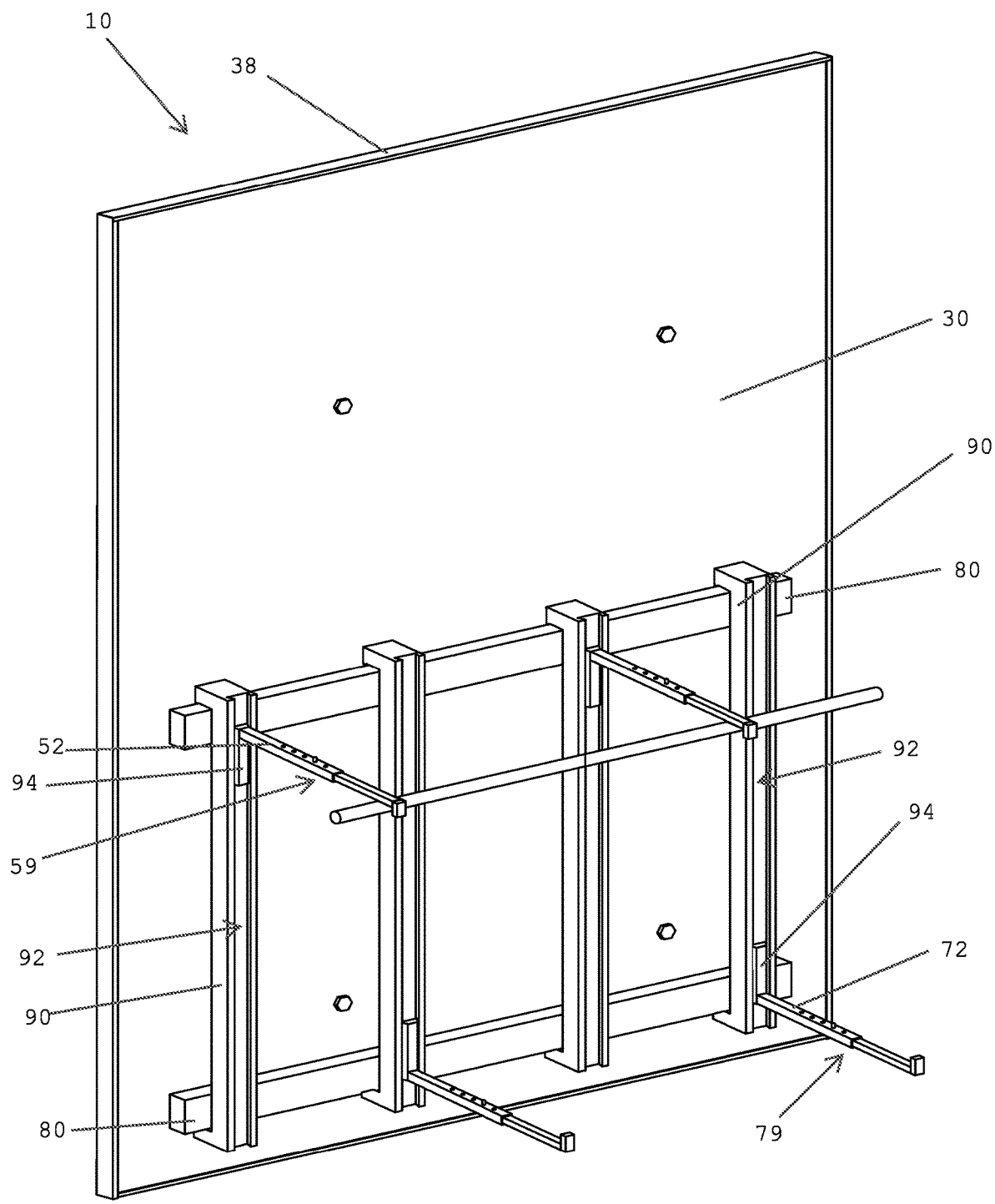
FIG. 7 is a perspective view of a heat shield according to an exemplary embodiment.
Figure 8:
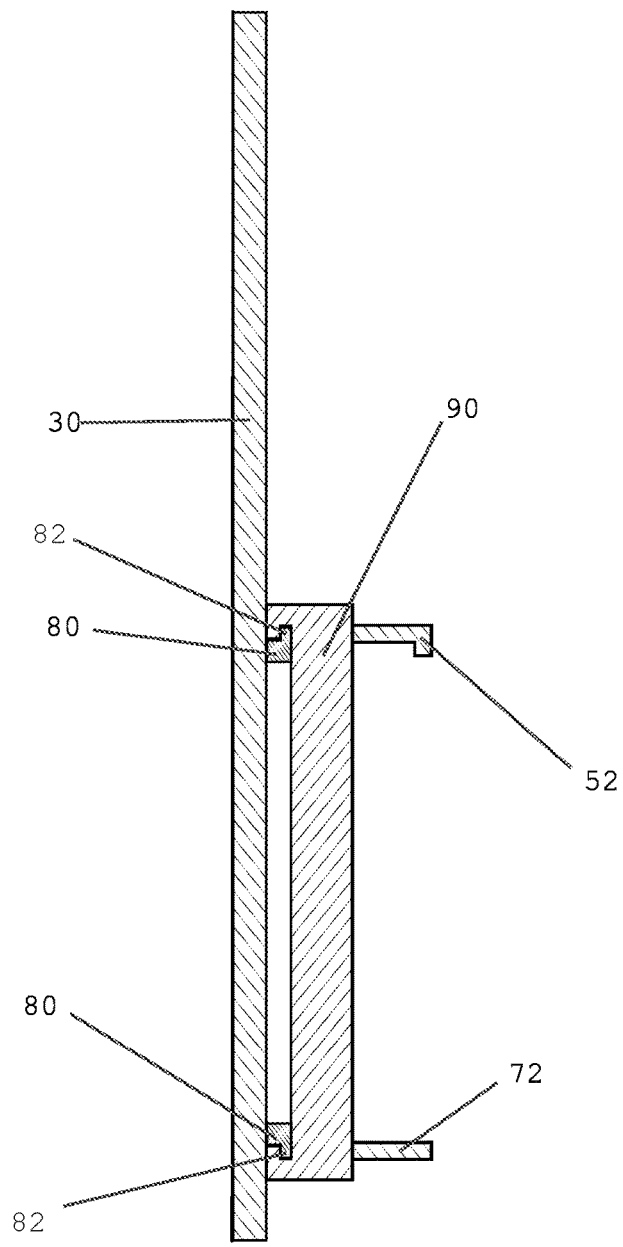
FIG. 8 is a side view of a heat shield according to an exemplary embodiment.
Figure 9:
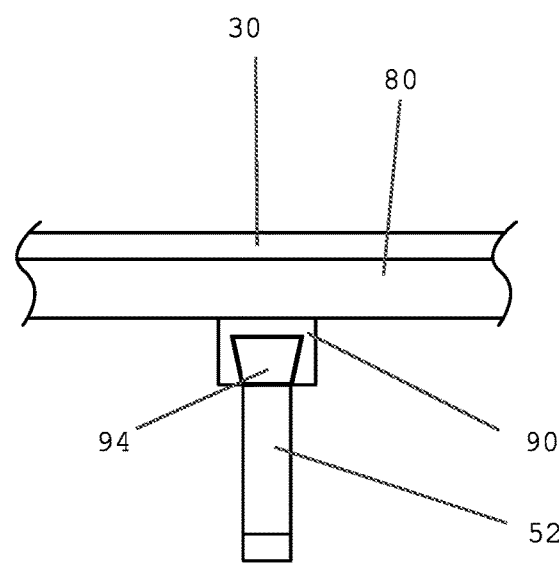
FIG. 9 is a top down view of a heat shield according to an exemplary embodiment.
Figure 10:
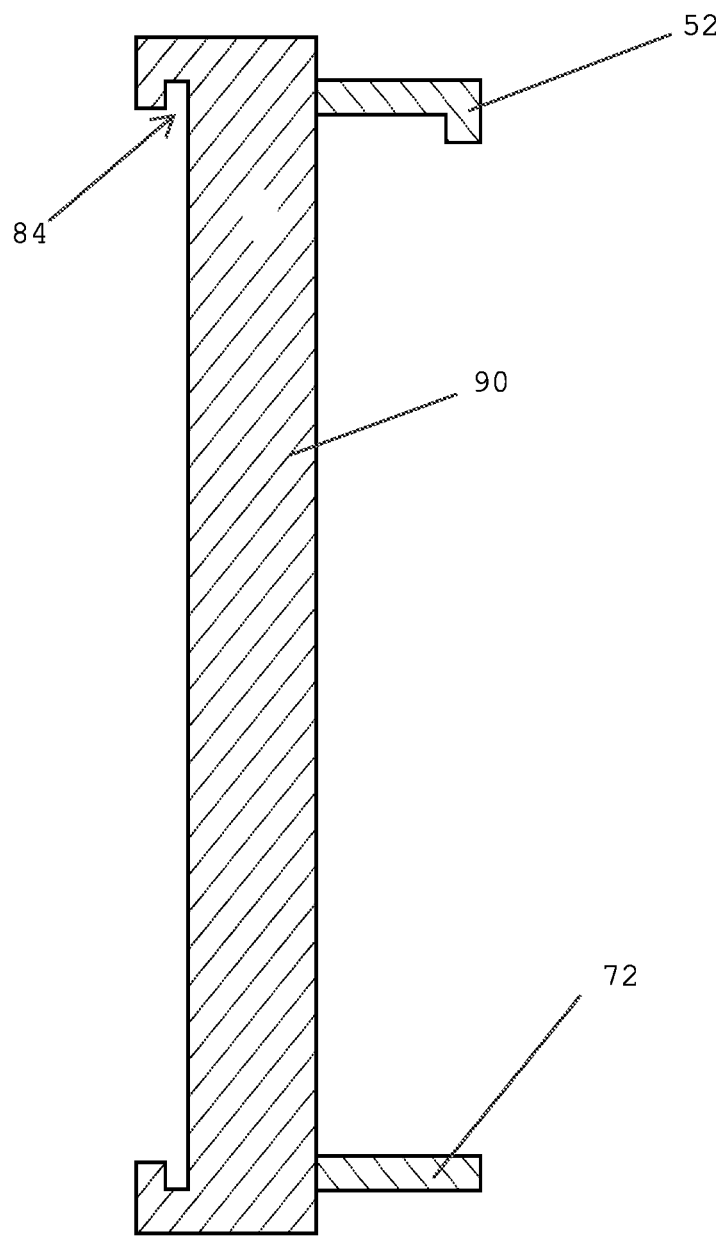
FIG. 10 is a side view of a vertical rail according to an exemplary embodiment.

In one embodiment, as shown in FIG. 6, the hook length adjustment mechanism 59 and the stabilizer length adjustment mechanism 79 can adjust to allow for the shield member 30 to tilt towards and/or away from the heat source 20. For example, without limitation, the hook length adjustment mechanism 59 can lock the hook extension portion 56 at a first length and the stabilizer length adjustment mechanism 79 can lock the stabilizer extension portion 76 at a second length, wherein the first length is greater than the second length thereby allowing for the top of the shield member 30 to tilt toward the heat source 20. By way of another example, the hook length adjustment mechanism 59 can lock the hook extension portion 56 at a first length and the stabilizer length adjustment mechanism 79 can lock the stabilizer extension portion 76 at a second length, wherein the first length is less than the second length thereby allowing for the top of the shield member 30 to tilt away from the heat source 20.

In one embodiment, the stabilizer bracket 72 can have a cover 78 positioned on the end of the stabilizer extension portion 76 to reduce or prevent the end of the stabilizer extension portion 76 from scratching the portion of the heat source 20 to which the stabilizer extension portion 76 rests.

In one embodiment, as shown in FIGS. 7-10, the attachment mechanism can have at least one horizontal rail 80 and at least one vertical rail 90 configured to allow for the shield member 30 to be positioned in a desired location in relation to a vent 22 of the heat source 20. The vertical rail 90 can be positioned substantially vertical to allow for the hook bracket 52 and/or stabilizer bracket 72 to traverse the shield member 30 substantially vertical. The hook bracket 52 and/or stabilizer bracket 72 can slideably engage the vertical rail 90 thereby allowing for the hook bracket 52 and/or stabilizer bracket 72 to traverse the vertical rail 90. When attached to the heat source 20, this mechanism allows for the shield member 30 to slide along a Y-axis so that the shield member 30 can be positioned at a desired location. The vertical rail 90 can have a vertical channel 92 extending the length of the vertical rail 90 and the hook bracket 52 and/or stabilizer bracket 72 can have a bracket protrusion 94 extending from the back of the hook bracket 52 and/or stabilizer bracket 72. The bracket protrusion 94 can have a cross-sectional shape and the vertical channel 92 can have a cross-sectional shape wherein the cross-sectional shape of the bracket protrusion 94 is substantially similar or can correspond with the cross-sectional shape of the vertical channel 92. Upon the vertical channel 92 receiving the bracket protrusion 94, the vertical rail 90 can be slideably engaged with the back of the hook bracket 52 and/or stabilizer bracket 72. In one embodiment, the attachment mechanism has four vertical rails 90, wherein, by way of example, a first hook bracket 52 slideably engages the first vertical rail 90, a second hook bracket 52 slideably engages the second vertical rail 90, a first stabilizer bracket 72 slideably engages the third vertical rail 90, and a second stabilizer bracket 72 slideably engages the fourth vertical rail 90.

The horizontal rail 80 can be secured to the shield member 30 by way of, for example, without limitation, fasteners, such as bolts and nuts, and screws, adhesive, or the like. The horizontal rail 80 can be positioned substantially horizontal to allow for the vertical rail 90, and thereby the hook bracket 52 and/or stabilizer bracket 72, to traverse the shield member 30 substantially horizontal. The vertical rail 90 can slideably engage the horizontal rail 80 thereby allowing for the vertical rail 90, and thereby the hook bracket 52 and/or stabilizer bracket 72, to traverse the horizontal rail 80. When attached to the heat source 20, this mechanism allows for the shield member 30 to slide along an X-axis so that it can be positioned at a desired location. The horizontal rail 80 can have a horizontal protrusion 82 extending the length of the horizontal rail 80 and the vertical rail 90 can have a horizontal channel 84 formed into the back of the vertical rail 90. The horizontal protrusion 82 can have a cross-sectional shape and the horizontal channel 84 can have a cross-sectional shape. The cross-sectional shape of the horizontal channel 84 can correspond with the cross-sectional shape of the horizontal protrusion 82, wherein upon the horizontal channel 84 receiving the horizontal protrusion 82, the horizontal rail 80 can be slideably engaged with the vertical rail 90. In one embodiment, the attachment mechanism has two horizontal rails 80, wherein the first horizontal rail 80 slideably engages the first end of the vertical rail 90 and the second horizontal rail 80 slideably engages the second end of the vertical rail 90.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

Modifications and variations of the present invention are possible in light of the above teachings. It is therefore to be understood that the invention may be practiced otherwise than as specifically described herein.

What is claimed is:

1. A heat shield comprising:
a shield member comprising a deflection layer and an absorption layer, and
an attachment mechanism comprising at least one bracket, wherein the attachment mechanism is configured to mount the shield member to a device for heating food and wherein the shield member is configured to be positioned external to the device for heating food.

2. The heat shield of claim 1 wherein the bracket comprises a hook bracket comprising a hook securing portion, a hook extension portion, and a hook portion configures to engage a portion of the heat source, wherein the hook portion engages the hook extension portion.

3. The heat shield of claim 2 wherein the hook bracket further comprises a hook adjustment mechanism configured to allow for the length of the hook extension portion to increase or decrease.

4. The heat shield of claim 1 wherein the attachment mechanism comprises at least one stabilizing bracket.

5. The heat shield of claim 4 wherein the stabilizer bracket comprises a stabilizer securing portion and a stabilizer extension portion, wherein the stabilizer extension portion is configured to engage the heat source.

6. The heat shield of claim 5 wherein the stabilizer bracket further comprises a stabilizer adjustment mechanism configured to allow for the length of the stabilizer extension portion to increase or decrease.

7. The heat shield of claim 4 wherein the stabilizer bracket comprises a cover positioned on the end of the stabilizer extension portion configured to reduce the end of the stabilizer extension portion from scratching the heat source.

8. The heat shield of claim 1 wherein the attachment mechanism comprises at least one vertical rail configured to slideably engage a hook bracket or a stabilizer bracket.

9. The heat shield of claim 8 wherein the vertical rail comprises a vertical channel and the hook bracket comprises a bracket protrusion extending from the back of the hook bracket, wherein the cross sectional shape of the bracket protrusion is substantially similar to the cross section shape of the vertical channel, and wherein the vertical channel is configured to receive the bracket protrusion.

10. The heat shield of claim 8 wherein the attachment mechanism further comprises at least one horizontal rail configured to slideably engage the vertical rail.

11. The heat shield of claim 10 wherein the horizontal rail comprises a horizontal protrusion and the vertical rail comprises a horizontal channel formed into the back of the vertical rail, wherein the cross-sectional shape of the horizontal channel is substantially similar to the cross sectional shape of the horizontal protrusion, and wherein the horizontal channel is configured to receive the horizontal protrusion.

12. A heat shield comprising:
a shield member comprising:
a front surface,
a back surface,
a deflection layer configured to redirect heat toward an area adjacent to the front surface of the shield member, and
an absorption layer configured to absorb the heat and reduce heat transfer from the back of the shield member to an area adjacent the back surface of the shield member, wherein the heat emanates from a device for heating food, wherein the shield member extends substantially vertical to direct the heat upward, wherein the shield member directs the heat through a passageway positioned between the shield member and the device for heating food, wherein the shield member is configured to be positioned external to the device for heating food.

13. The heat shield of claim 12 wherein the absorption layer is made of a cement backerboard material.

14. The heat shield of claim 12 wherein the shield member further comprises a protection layer.

15. The heat shield of claim 14 wherein the absorption layer is positioned between the deflection layer and the protection layer.

16. The heat shield of claim 14 wherein a thickness of the protection layer is greater than the thickness of the deflection layer.

17. The heat shield of claim 14 wherein the shield member comprises an air gap layer positioned between the absorption layer and the protection layer.

18. The heat shield of claim 12 wherein the shield member comprises a protective boarder extending at least a portion of the periphery of the shield member.

19. The heat shield of claim 12 wherein the shield member comprises a vertical portion and an angled portion, wherein the angled portion engages the vertical portion at an angle less than 180 degrees.

20. The heat shield of claim 12 wherein the deflection layer is positioned closer to the device for heating food than the absorption layer.

* * * * *